United States Patent [19]
Breuer et al.

[11] 3,929,778
[45] Dec. 30, 1975

[54] [(ACYLCARBAMOYL) THIOACETYL] CEPHALOSPORIN DERIVATIVES

[75] Inventors: Hermann Breuer; Uwe D. Treuner, both of Regensburg, Germany

[73] Assignee: E. R. Squibb & Sons, Inc., Princeton, N.J.

[22] Filed: Aug. 8, 1974

[21] Appl. No.: 495,597

[52] U.S. Cl.... 260/243 C; 260/332.2 A; 260/347.2; 260/455 A
[51] Int. Cl.² ............... C07D 501/28; A61K 31/545
[58] Field of Search .............................. 260/243 C

[56] References Cited
OTHER PUBLICATIONS
Gottstein et al., J. Med. Chem., Vol. 14, No. 8, pp. 770–772 (1971).

*Primary Examiner*—Donald G. Daus
*Assistant Examiner*—Diana G. Rivers
*Attorney, Agent, or Firm*—Lawrence S. Levinson; Merle J. Smith

[57] ABSTRACT

[(Acylcarbamoyl)thioacetyl]cephalosporin derivatives of the formula

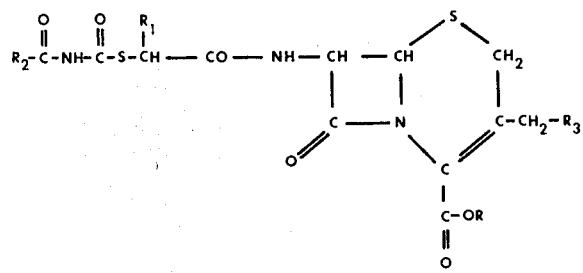

wherein R is hydrogen, lower alkyl, phenyl-lower alkyl, tri(lower alkyl)silyl, a salt forming ion, or the group

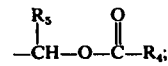

$R_1$ is hydrogen, lower alkyl, phenyl, thienyl or furyl; $R_2$ is lower alkyl, lower alkoxy, phenyl or phenyl-lower alkyl; $R_3$ is hydrogen, hydroxy or lower alkanoyloxy; $R_4$ is lower alkyl, phenyl or phenyl-lower alkyl; and $R_5$ is hydrogen or lower alkyl, are useful as antimicrobial agents.

13 Claims, No Drawings

[(ACYLCARBAMOYL) THIOACETYL] CEPHALOSPORIN DERIVATIVES

SUMMARY OF THE INVENTION

This invention relates to new [(acylcarbamoyl)thioacetyl]cephalosporanic derivatives of the formula

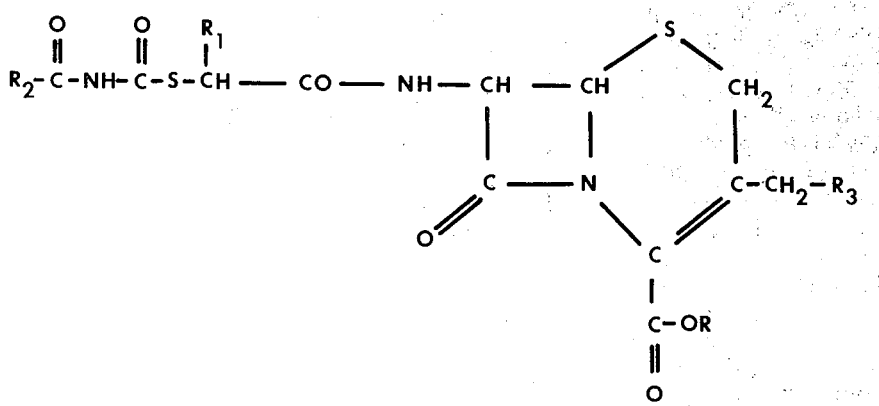

R represents hydrogen, lower alkyl, phenyl-lower alkyl, tri-(lower alkyl)silyl, a salt forming ion or the group

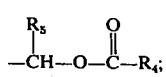

$R_1$ represents hydrogen, lower alkyl, phenyl, thienyl or furyl; $R_2$ represents lower alkyl, lower alkoxy, phenyl or phenyl-lower alkyl; $R_3$ represents hydrogen, hydroxy or lower alkanoyloxy; $R_4$ represents lower alkyl, phenyl or phenyl-lower alkyl; and $R_5$ is hydrogen or lower alkyl.

The preferred members within each group are as follows: R is hydrogen, alkali metal, trimethylsilyl, benzhydryl or

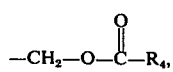

especially hydrogen, pivaloyloxy, sodium or potassium, $R_1$ is hydrogen, lower alkyl or phenyl, especially hydrogen or phenyl; $R_2$ is lower alkyl, especially methyl or ethyl, or phenyl; $R_3$ is hydrogen or acetoxy; and $R_4$ is methyl or t-butyl.

DETAILED DESCRIPTION OF THE INVENTION

The various groups represented by the symbols have the meanings defined below and these definitions are retained throughout this specification.

The lower alkyl groups are the straight and branched chain hydrocarbon groups in the series from methyl to heptyl, methyl and ethyl being generally preferred. The lower alkoxy groups are of the same type.

The lower alkanoyloxy groups represented by $R_3$ include the acyl radicals of lower fatty acids containing alkyl radicals of the type described above, e.g., acetoxy, propionoxy, butyryloxy, etc., acetoxy being preferred.

The phenyl-lower alkyl radicals include a phenyl ring attached to a lower alkyl group of the kind described above as well as those containing two phenyl groups such as benzhydryl.

The salt forming ions represented by R are metal ions, e.g., alkali metal ions such as sodium or potassium, alkaline earth metal ions such as calcium or magnesium or an amine salt ion, e.g., a (lower alkyl)amine like methylamine or triethylamine, etc.

The new [(acylcarbamoyl)thioacetyl]cephalosporin derivatives of this invention are produced by reacting a 7-aminocephalosporanic acid compound [which includes 7-aminocephalosporanic acid (7-ACA), 7-amino-3-desacetoxy-cephalosporanic acid (7-ADCA) and other derivatives] of the formula

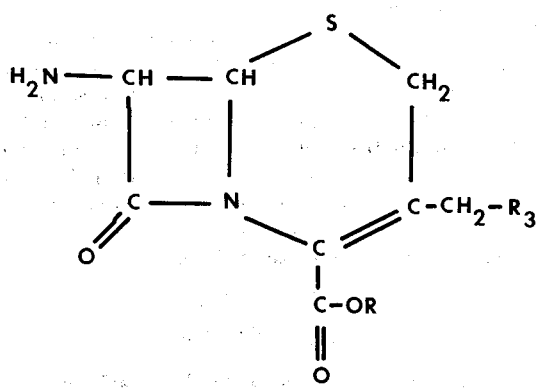

or derivative thereof, with an [(acylcarbamoyl)thio]acetic acid of the formula (III)

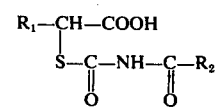

or an acid halide or anhydride thereof.

The derivatives of II referred to include, for example, the triethylamine derivative, benzhydryl ester or the like. The acid halide of III is preferably the chloride. The reaction can also be carried out in the presence of dicyclohexylcarbodiimide or the like.

The reaction between the 7-aminocephalosporanic acid compound and the [(acylcarbamoyl)thio]acetic acid is effected, for example, by dissolving or suspending the latter or its acid chloride or anhydride in an inert organic solvent such as chloroform, tetrahydrofuran, methylene chloride, dioxane, benzene or the like, and adding, at a reduced temperature of about 0° to −20°C about an equimolar amount of the 7-ACA or 7-ADCA compound, preferably in the presence of an activating compound such as dicyclohexylcarbodiimide. The product of the reaction is then isolated by conventional procedures, e.g., by concentration or evaporation of the solvent. When the benzhydryl ester is obtained, treatment of this product with trifluoroacetic and anisole yields the free carboxylic acid. Salts are produced in conventional manner by reaction with a base containing the desired cation.

A preferred method of producing the products of this invention comprises reacting approximately equimolar amounts of the 7-aminocephalosporanic acid compound of formula II wherein R is benzhydryl and the acid of formula III in a solvent such as tetrahydrofuran at a temperature in the range of about 0° to 5° C in the presence of about an equimolar amount of dicyclohexylcarbodiimide. The dicyclohexylurea which is formed is filtered off and the product, which is the corresponding compound of formula I wherein R, $R_1$, $R_2$ and $R_3$ represent the same groups as in the starting materials, is worked up from the filtrate by conventional procedures, e.g., concentration, crystallization, etc. The free acid, i.e. the product of formula I wherein R is hydrogen, is obtained by treating the benzhydryl ester with trifluoroacetic acid and anisole. Salts are obtained by treatment of the free acid with the appropriate basic material. For example, the potassium salt is obtained by the use of potassium ethylhexanoate or the sodium salt is obtained by the use of sodium bicarbonate.

A preferred alternate process comprises forming a mixed anhydride from the acid of formula III, for example by reaction with a chloroformate like isobutylchloroformate in the presence of N-methylmorpholine in a dry solvent like absolute tetrahydrofuran, and reacting this mixture anhydride with a 7-aminocephalosporanic acid compound of formula II wherein R is hydrogen at a temperature below 0°, e.g., about −5°C, in an aqueous solvent like aqueous tetrahydrofuran. The product is worked up as described above and salts are formed in the same manner.

When R is the acyloxymethyl group

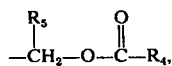

this group is introduced into the 7-aminocephalosporanic acid moiety prior to the reaction with the [(acylcarbamoyl)thio]acetic acid or derivative by treatment with one to two moles of a halomethyl ester of the formula (IV)

wherein hal is halogen, preferably chlorine or bromine, in an inert organic solvent such as dimethylformamide, acetone, dioxane, benzene or the like, at about ambient temperature or below.

The [(acylcarbamoyl)thio]acetic acid of formula III is produced by reacting a mercaptoacetic acid of the formula (V)

with an isocyanate of the formula (VI)

in the presence of an inorganic or organic base like an alkali metal hydroxide such as sodium hydroxide, or triethylamine or dimethylaniline or the like, in a solvent like methylene chloride.

Further process details are provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They are used as antibacterial agents in a prophylactic manner, e.g., in cleaning or disinfecting compositions, or otherwise to combat infections due to organisms such as those named above, and in general can be utilized in a manner similar to cephradine and other cephalosporins. For example, a compound of formula I or a physiologically acceptable salt thereof can be used in various animal species in an amount of about 1 to 150 mg./kg., daily, orally or parenterally, in single or two to four divided doses to treat infections of bacterial origin, e.g., 5.0 mg./kg. in mice.

Up to about 600 mg. of a compound of formula I or a physiologically acceptable salt thereof is incorporated in an oral dosage form such as tablets, capsules or elixirs or in a suppository or in an injectable form in a sterile aqueous vehicle prepared according to conventional pharmaceutical practice.

The following examples are illustrative of the invention. All temperatures are in degrees celsius. Additional variations are produced in the same manner by appropriate substitution in the starting material.

EXAMPLE 1

[(Benzoylcarbamoyl)thio]acetic acid

To a solution of 4.6 gms. (0.05 mol.) of mercaptoacetic acid and 6.9 ml. (0.05 mol.) of triethylamine in 80 ml. of methylene chloride is added dropwise at 0° a solution of 7.3 gms. (0.05 mol.) of benzoyl isocyanate in 20 ml. of methylene chloride. The solution is stirred for one hour and the solvent is removed under vacuum. The residue is dissolved in water and acidified with dilute hydrochloric acid. The yield of product, [(benzoylcarbamoyl)thio]acetic acid, is 9.8 gms., m.p. 164°. After recrystallization from ethanol, the product melts at 166°–167°.

EXAMPLE 2

3-[(Acetyloxy)methyl]-7β-[[[[(benzoylamino)carbonyl]thio]acetyl]amino]-8-oxo-5-thia-1-azabicyclo[4.2.0]oct-2-ene-2-carboxylic acid and potassium salt The mixed anhydride is formed from 1.6 gms. of [(benzoylcarbamoyl)thio]acetic acid, 0.93 ml. of isobutylchloroformate and 0.74 ml. of N-methylmorpholine in 40 ml. of absolute tetrahydrofuran at −15°.

The solution of the mixed anhydride is combined with an ice cold solution of 1.8 gms. of 7-aminocephalosporanic acid and 1.47 ml. of N-methylmorpholine in 30 ml. of 50% aqueous tetrahydrofuran. The solution is stirred for 1 hour at −5° and 1 hour at 0°. The tetrahydrofuran is distilled off under vacuum. The aqueous solution is layered over with ethyl acetate and acidified. The ethyl acetate phase is concentrated and 2.3 gms. of crude product, 3-[(acetyloxy)methyl]-7β-[[[[(benzoylamino)carbonyl]thio]acetyl]amino]-8-oxo-5-thia-1-azabicyclo[4.2.0]oct-2-ene-2-carboxylic acid is isolated. The product is dissolved in methanol and potassium ethyl hexanoate is added. Upon the addition of ether, 3-[(acetyloxy)methyl]-7β-[[[(benzoylamino)-carbonyl]thio]acetyl]amino]-8-oxo-5-thia-1-azabicyclo[4.2.0]octo-2-ene-2-carboxylic acid, potassium salt, hydrate precipitates, m.p. 148°–151° (dec.).

EXAMPLE 3

3-[(Acetyloxy)methyl]-7β-[[[(benzoylamino)carbonyl]thio]acetyl]amino]-8-oxo-thia-1-azabicyclo[4,2.0]oct-2-ene-2-carboxylic acid, diphenylmethyl ester 2.87 gms. (0.012 mol.) of [(benzoylcarbamoyl)thio]acetic acid and 4.38 gms. (0.01 mol.) of 7-aminocephalosporanic acid diphenylmethyl ester are dissolved in 50 ml. of tetrahydrofuran and 2.27 gms. (0.011 mol.) of dicyclohexylcarbodiimide are added at 0°–5°. The mixture is stirred for 90 minutes at 0°–5° and 90 minutes at room temperature. The mixture is then filtered, concentrated and ethyl acetate is added to the residue. 3.3 gms. of the product 3-[(acetyloxy)methyl]7β-[[[(benzoylamino)carbonyl]thio]acetyl]amino]-8-oxo-5-thia-1-azabicyclo[4.2.0]oct-2-ene-2-carboxylic acid, diphenylmethyl ester, which is slightly soluble in ethyl acetate, is obtained, m.p. 162°–164°. After recrystallization from methanol, the product melts at 165°–167° (dec.).

EXAMPLE 4

3-[(Acetyloxy)methyl]-7β-[[[(benzoylamino)carbonyl]thio]acetyl]amino]-8-oxo-5-thia-1-azabicyclo[4.2.0]oct-2-ene-2-carboxylic acid.

1.1 gms. of 3-[(acetyloxy)methyl]-7β-[[[(benzoylamino)carbonyl]thio]acetyl]amino]-8-oxo-5-thia-1-azabicyclo[4.2.0]oct-2-ene-2-carboxylic acid, diphenylmethyl ester, is added at 0° to 5° to a mixture of 20 ml. of trifluoroacetic acid and 6 ml. of anisole. The mixture is stirred for 10 minutes at room temperature, concentrated and treated with ether. 0.75 gms. of the product, 3-[(acetyloxy)methyl]7β-[[[(benzoylamino)carbonyl]thio]acetyl]amino]-8-oxo-5-thia-1-azabicyclo[4.2.0]oct-2-ene-2-carboxylic acid, is obtained, m.p. 162°–163° (dec.).

EXAMPLE 5

α-[[(Benzoylamino)carbonyl]thio]benzeneacetic acid 8.4 gms. (0.05 mol.) of α-phenylmercaptoacetic acid, 6.9 ml. (0.05 mol) of triethylamine and 7.4 gms. (0.05 mol.) of benzoyl isocyanate are reacted according to the procedure in Example 1. The product α-[[(benzoylamino)carbonyl]thio]benzeneacetic acid, is purified by recrystallization several times from methanol; yield 5.7 gms. m.p. 178°–180°(dec.).

EXAMPLE 6

3-[(Acetyloxy)methyl]-7β-[[[(benzoylamino)carbonyl]thio]phenylacetyl]amino]-8-oxo-5-thia-1-azabicyclo[4.2.0]oct-2-ene-2-carboxylic acid, diphenylmethyl ester 3.5 gms. of α-[[(benzoylamino)carbonyl]thio]benzeneacetic acid and 4.06 gms. of 7-aminocephalosporanic acid, benzhydryl ester, are reacted according to the procedure of Example 3. 4.4 gms. of crude 3-[(acetyloxy)methyl]-7β-[[[(benzoylamino)carbonyl]thio]phenylacetyl]amino]-8-oxo-5-thia-1-azabicyclo[4.2.0]oct-2-ene-2-carboxylic acid, diphenylmethyl ester are obtained. After recrystallization from ethyl acetate, the product melts at 180°–182° (dec.).

EXAMPLE 7

3-[(Acetyloxy)methyl]-7β-[[[(benzoylamino)carbonyl]thio]phenylacetyl]amino]-8-oxo-5-thia-1-azabicyclo[4.2.0]oct-2-ene-2-carboxylic acid 1.8 gms. of 3-[(acetyloxy)methyl]-7β-[[[(benzoylamino)carbonyl]thio]phenylacetyl]amino]-8-oxo-5-thia-1-azabicyclo[4.2.0]oct-2-ene-2-carboxylic acid, diphenylmethyl ester are treated with trifluoroacetic acid and anisole according to the procedure of Example 4 to obtain 1.4 gms. of 3-[(acetyloxy)methyl]-7β-[[[(benzoylamino)carbonyl]thio]phenylacetyl]amino]-8-oxo-5-thia-1-azabicyclo[4.2.0]oct-2-ene-2-carboxylic acid, m.p. 167°–168° (dec.).

EXAMPLE 8

3-[(Acetyloxy)methyl]-7β-[[[(benzoylamino)carbonyl]thio]phenylacetyl]amino]-8-oxo-5-thia-1-azabicyclo[4.2.0]oct-2-ene-2-carboxylic acid disodium salt 592 mg. (0.001 mol.) of 3-[(acetyloxy)methyl]-7β-[[[(benzoylamino)carbonyl]thio]phenylacetyl]amino]-8-oxo-5-thia-1-azabicyclo[4.2.0]oct-2-ene-2-carboxylic acid are brought into solution in 200 ml. of water with 84 mg. of sodium bicarbonate and the solution is freeze dried to obtain 650 mg. of 3-[(acetyloxy)methyl]-7β-[[[(benzoylamino)carbonyl]thio]-phenylacetyl]amino]-8-oxo-5-thia-1-azabicyclo[4.2.0]oct-2-ene-2-carboxylic acid disodium salt.

EXAMPLE 9

DL-α-[[(acetylamino)carbonyl]thio]benzeneacetic acid

Equimolar proportions of α-phenylmercaptoacetic acid, acetyl isocyanate and triethylamine are reacted according to the procedure of Example 1 to obtain DL-α-[[(acetylamino)carbonyl]thio]benzeneacetic acid which is recrystallized from ether, m.p. 153°–155° (dec.).

EXAMPLE 10

7β-[[[(Acetylamino)carbonyl]thio]phenylacetyl]amino]-3-[(acetyloxy)methyl]-8-oxo-5-thia-1-azabicyclo[4.2.0]oct-2-ene-2-carboxylic acid, diphenylmethyl ester 2.53 gms. (0.01 mol.) of DL-α-[[(acetylamino)carbonyl]thio]benzeneacetic acid, 3.64 gms. (0.0083 mol.) of 7-aminocephalosporanic acid, benzhydryl ester and 1.89 gms. (0.0092 mol.) of dicyclohexylcarbodiimide are reacted according to the procedure of Example 3 to obtain 5.5 gms. of crude 7β-[[[(acetylamino)carbonyl]thio]phenylacetyl]amino]-3-[(acetyloxy)methyl]-8-oxo-5-thia-1-azabicyclo[4.2.0]oct-2-ene-2-carboxylic acid, diphenylmethyl ester. The product is purified by chromatography on a column of 500 gms. of Kieselgel (Merck). It is eluted with a mixture of toluene and ethylacetate (1:1). Fractions of about 40 ml. each are collected and subjected to thin layer chromatography. Fractions 38 to 65, which contain most of the desired product, are concentrated. The residue is treated with a little ethyl acetate. 7β-[[[(acetylamino)carbonyl]thio]phenylacetyl]amino]-3-[(acetyloxy)methyl]-8-oxo-5-thia-1-azabicyclo[4.2.-

0]oct-2-ene-2-carboxylic acid, diphenylmethyl ester crystallizes, m.p. 197°–199° (dec.).

EXAMPLE 11

7β-[[[[(Acetylamino)carbonyl]thio]phenylacetyl]amino]-3-[(acetyloxy)methyl]-8-oxo-5-thia-1-azabicyclo[4.2.0]oct-2-ene-2-carboxylic acid 200 mg. of 7β-[[[[(acetylamino)carbonyl]thio]phenylacetyl]amino]-3-[(acetyloxy)methyl]-8-oxo-5-thia-1-azabicyclo[4.2.0]oct-2-ene-2-carboxylic acid diphenylmethyl ester are treated with 4 ml. of trifluoroacetic acid and 1.2 ml. of anisole. 120 mg. of the product, 7β-[[[[(acetylamino)carbonyl]thio]phenylacetyl]amino]-3-[(acetyloxy)methyl]-8-oxo-5-thia-1-azabicyclo[4.2.0]oct-2-ene-2-carboxylic acid, are obtained, m.p. 153°–155° (dec.).

EXAMPLE 12

α-[[[(Ethoxycarbonyl)amino]carbonyl]thio]benzeneacetic acid

α-phenylmercaptoacetic acid is reacted with ethoxycarbonylisocyanate and triethylamine according to the procedure of Example 1 to obtain α-[[[(ethoxycarbonyl)amino]carbonyl]thio]benzeneacetic acid, m.p. 129° (cyclohexane/benzene).

EXAMPLE 13

DL-3-[(acetyloxy)methyl]-7β-[[[[(ethoxycarbonyl)amino]carbonyl]thio]phenylacetyl]amino]-8-oxo-5-thia-1-azabicyclo[4.2.0]oct-2-ene-2-carboxylic acid, diphenylmethyl ester 4.2 gms. (0.01 mol.) of 7-aminocephalosporanic acid, benzhydryl ester, 2.6 gms. (0.01 mol.) of α-[[[(ethoxycarbonyl)amino]carbonyl]thio]benzeneacetic acid and 2.06 gms. (0.01 mol.) of dicyclohexylcarbodiimide in 100 ml. of absolute tetrahydrofuran are stirred for 6 hours at 5°. After filtering and concentrating the filtrate under vacuum, 5 gms of DL-3-[(acetyloxy)methyl]-7β-[[[[(ethoxycarbonyl)amino]carbonyl]thio]phenylacetyl]amino]-8-oxo-5-thia-1-azabicyclo[4.2.-0]oct-2-ene-2-carboxylic acid, diphenyl methyl ester are obtained as an oily residue.

EXAMPLE 14

DL-3-[(Acetyloxy)methyl]-7β-[[[[(ethoxycarbonyl)amino]carbonyl]thio]phenylacetyl]amino]-8-oxo-5-thia-1-azabicyclo[4.2.0]oct-2-ene-2-carboxylic acid DL-3-[(Acetyloxy)methyl]-7β-[[[[(ethoxycarbonyl)amino]carbonyl]thio]phenylacetyl]amino]-8-oxo-5-thia-1-azabicyclo[4.2.0]oct-2-ene-2-carboxylic acid diphenylmethyl ester is treated with trifluoroacetic acid and anisole according to the procedure of Example 4 and the product is precipitated from methylene chloride/carbon tetrachloride to obtain DL-3-[(acetyloxy)methyl]-7β-[[[[(ethoxycarbonyl)amino]carbonyl]thio]phenylacetyl]amino]-8-oxo-5-thia-1-azabicyclo[4.2.0]oct-2-ene-2-carboxylic acid as a beige powder, m.p. 116°.

EXAMPLE 15

DL-3-[(Acetyloxy)methyl]-7β-[[[[(ethoxycarbonyl)amino]carbonyl]thio]phenylacetyl]amino]-8-oxo-5-thia-1-azabicyclo[4.2.0]oct-2-ene-2-carboxylic acid, potassium salt An aqueous solution containing equimolar amounts of DL-3-[(acetyloxy)methyl]-7β-[[[[(ethoxycarbonyl)amino]carbonyl]thio]phenylacetyl]amino]-8-oxo-5-thia-1-azabicyclo[4.2.0]oct-2-ene-2-carboxylic acid and potassium bicarbonate is freeze dried to obtain DL-3-[(acetyloxy)methyl]-7β-[[[[(ethoxycarbonyl)amino]carbonyl]thio]phenylacetyl]amino]-8-oxo-5-thia-1-azabicyclo[4.2.0]oct-2-ene-2-carboxylic acid, potassium salt in the form of a white powder, m.p. 143°.

The following additional products are similarly obtained:

DL-7β-[[[[(methoxycarbonyl)amino]carbonyl]acetyl]amino]-3-(hydroxymethyl)-8-oxo-5-thia-1-azabicyclo[4.2.0]oct-2-ene-carboxylic acid.

DL-7β-[[[[(n-butoxycarbonyl)amino]carbonyl]thio]phenylacetyl]amino-3-(hydroxymethyl)-8-oxo-5-thia-1-azabicyclo[4.2.0]oct-2-ene carboxylic acid.

DL-3-[(acetyloxymethyl]-7β-[[[[(benzyloxycarbonyl)amino]carbonyl]thio]phenylacetyl]amino]-3-(hydroxymethyl)-8-oxo-5-thia-1-azabicyclo[4.2.0]oct-2-ene-2-carboxylic acid.

The following additional products having the formula (c) in the table are obtained by the procedure of Example 4 by substituting for the 7-aminocephalosporanic acid diphenylmethyl ester, the starting material (a), and for the [(benzoylcarbamoyl)thio]acetic acid, the starting material (b) with the substituents indicated in the table:

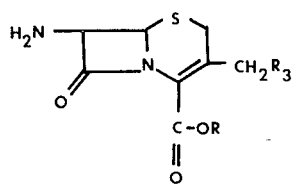
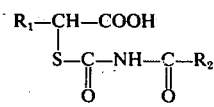
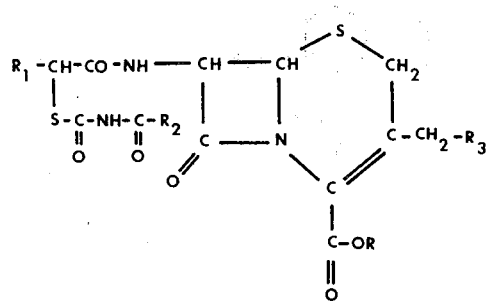

| | (a) | (b) | | (c) |
|---|---|---|---|---|
| Example | R | $R_1$ | $R_2$ | $R_3$ |
| 16 | —$CH_3$ | H | —$C_3H_7$ | H |
| 17 | —$C_2H_5$ | —$CH_3$ | —$C_2H_5$ | —OH |
| 18 | —$CH_2C_6H_5$ | —$C_3H_7$ | —$C_2H_5$ | —$OCOCH_3$ |
| 19 | —$CH_2OC(=O)$—$CH(CH_3)_2$ | $C_6H_5$— | —$CH_2C_6H_5$ | —$OCOCH_3$ |
| 20 | —$CH_2OC(=O)$—$C_6H_5$ | $C_6H_5$— | —$CH_3$ | —$OCOCH_3$ |
| 21 | —$C_2H_4$—(phenyl) | $C_6H_5$ | —$C_2H_5$ | H |
| 22 | —$CH(C_6H_5)_2$ | (thienyl) | —$C_2H_5$ | —$OCOCH_3$ |
| 23 | —$Si(CH_3)_3$ | (furyl) | —$CH_3$ | H |
| 24 | —$CH_2$—$OC(=O)$—$CH_2$—(phenyl) | (thienyl) | —$CH_3$ | H |
| 25 | $Si(CH_3)_3$ | (phenyl) | -n-butyl | H |
| 26 | —$N(C_2H_5)_3$ | (phenyl) | —$C_3H_7$ | —$OCOCH_3$ |
| 27 | K | (thienyl) | —$CH_3$ | H |
| 28 | H | H | —$C_6H_5$ | —$OCOCH_3$ |
| 29 | H | H | —$OCH_3$ | —$OCOCH_3$ |
| 30 | H | H | —$CH_3$ | —$OCOCH_3$ |
| 31 | H | (furyl) | —$C_2H_5$ | —$OCOCH_3$ |
| 32 | H | (thienyl) | —$OC_2H_5$ | —$OCOCH_3$ |
| 33 | —$CH(C_6H_5)_2$ | $C_6H_5$— | —$CH_3$ | H |
| 34 | —$CH(CH_3)OC(=O)$—$CH_3$ | $C_6H_5$— | —$C_6H_5$ | —$OCOCH_3$ |
| 35 | H | (thienyl) | —$C_6H_5$ | —$OCOCH_3$ |

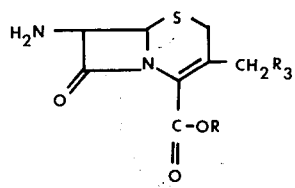
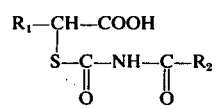
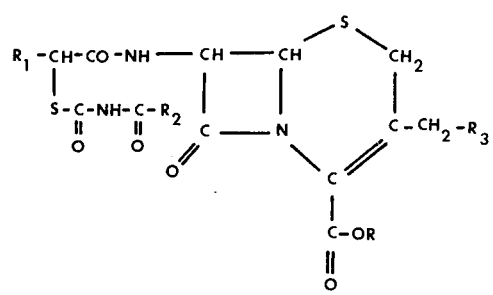

| | (a) | (b) | | (c) | |
|---|---|---|---|---|---|
| Example | R | $R_1$ | | $R_2$ | $R_3$ |
| 36 | H | thienyl | | $-CH_2C_6H_5$ | H |
| 37 | K | furyl | | $-CH_2C_6H_5$ | $-OCOCH_3$ |
| 38 | H | furyl | | $-C_6H_5$ | $-OCOCH_3$ |
| 39 | Na | furyl | | $-C_2H_5$ | H |

What is claimed is:

1. A compound of the formula

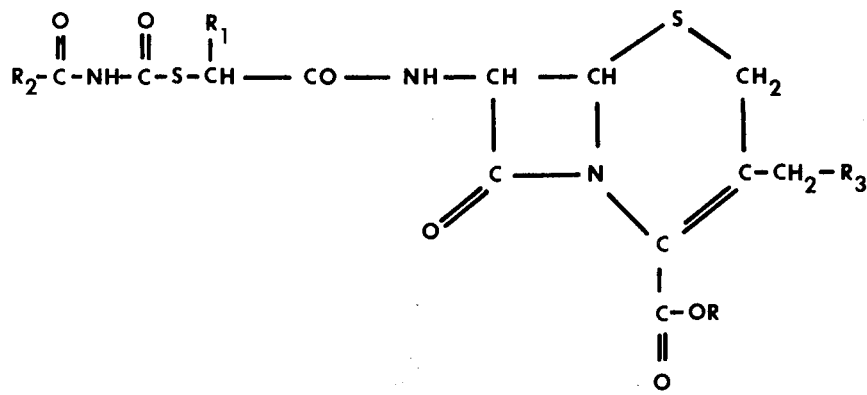

wherein R is hydrogen, lower alkyl, phenyl-lower alkyl, diphenylmethyl, tri(lower alkyl)silyl,

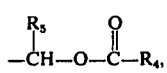

alkali metal, alkaline earth metal, mono(lower alkyl)amine salt or tri(lower alkyl)amine salt; $R_1$ is hydrogen, lower alkyl, phenyl, thienyl or furyl; $R_2$ is lower alkyl, lower alkoxy, phenyl, phenyl-lower alkyl or diphenylmethyl; $R_3$ is hydrogen, hydroxy or lower alkanoyloxy; $R_4$ is lower alkyl, phenyl, phenyl-lower alkyl or diphenylmethyl; and $R_5$ is hydrogen or lower alkyl; said lower alkyl, lower alkoxy and lower alkanoyloxy groups having up to seven carbon atoms.

2. A compound as in claim 1 wherein $R_1$ is phenyl.
3. A compound as in claim 1 wherein $R_1$ is hydrogen.
4. A compound as in claim 1 wherein $R_2$ is phenyl or lower alkyl.
5. A compound as in claim 1 wherein R is hydrogen, alkali metal, trimethylsilyl, benzhydryl or

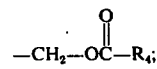

$R_1$ is hydrogen, lower alkyl or phenyl; $R_2$ is lower alkyl or phenyl; $R_3$ is hydrogen or acetoxy; and $R_4$ is methyl or t-butyl.

6. A compound as in claim 3 wherein R is hydrogen, $R_2$ is phenyl and $R_3$ is acetoxy.
7. A compound as in claim 2 wherein R is hydrogen, $R_2$ is phenyl and $R_3$ is lower alkanoyloxy.

8. A compound as in claim 3 wherein R is alkali metal, $R_2$ is phenyl and $R_3$ is lower alkanoyloxy.

9. A compound as in claim 2 wherein R is hydrogen; $R_2$ is phenyl and $R_3$ is acetoxy.

10. A compound as in claim 2 wherein R is hydrogen, $R_2$ is lower alkyl and $R_3$ is lower alkanoyloxy.

11. A compound as in claim 10 wherein the lower alkyl group is methyl and the lower alkanoyloxy group is acetoxy.

12. A compound as in claim 2 wherein R is hydrogen, $R_2$ is lower alkoxy and $R_3$ is lower alkanoyloxy.

13. A compound as in claim 12 wherein the lower alkoxy group is ethoxy and the lower alkanoyloxy group is acetoxy.

* * * * *